United States Patent [19]

Lipp

[11] Patent Number: 4,486,130
[45] Date of Patent: Dec. 4, 1984

[54] ROTARY TOOL WITH TOOL POSITIONING ADJUSTMENT

[76] Inventor: Willi Lipp, Fröbelstr. 62, D-5810 Witten, Fed. Rep. of Germany

[21] Appl. No.: 416,133

[22] Filed: Sep. 9, 1982

[30] Foreign Application Priority Data

Sep. 12, 1981 [DE] Fed. Rep. of Germany ....... 3136204

[51] Int. Cl.³ .............................................. B23B 27/16
[52] U.S. Cl. .................................... 408/181; 408/147; 408/153
[58] Field of Search ................. 408/13, 181, 183, 152, 408/158, 159, 198, 146, 147, 1; 82/2 E, 1.2

[56] References Cited

U.S. PATENT DOCUMENTS

| | | | |
|---|---|---|---|
| 3,311,003 | 3/1967 | Daugherty | 82/1.2 |
| 3,344,693 | 10/1967 | Scholl | 408/181 X |
| 3,486,401 | 12/1969 | Kelm | 408/181 |
| 3,599,517 | 8/1971 | Muller | 408/152 X |
| 3,667,856 | 6/1972 | Walker | 408/146 X |
| 3,767,317 | 10/1973 | Ortlieb | 408/183 |
| 4,006,995 | 2/1977 | Gruner | 408/183 X |
| 4,063,843 | 12/1977 | Barkley et al. | 408/146 |
| 4,387,612 | 6/1983 | Eckle et al. | 82/2 E |
| 4,398,854 | 8/1983 | Pape et al. | 408/181 X |
| 4,416,569 | 11/1983 | Yamakage et al. | 408/147 X |

FOREIGN PATENT DOCUMENTS 201108 12/1982 Japan .................. 408/147

Primary Examiner—William R. Briggs
Assistant Examiner—Glenn L. Webb
Attorney, Agent, or Firm—Karl F. Ross

[57] ABSTRACT

A boring tool or like rotating tool, especially for a NC machine, is provided with a laterally projecting plunger which can be brought into contact with an abutment of the machine by the tool position mechanism therein to operate a stepping mechanism within the tool and correct the position of the cutting edge therein.

9 Claims, 3 Drawing Figures

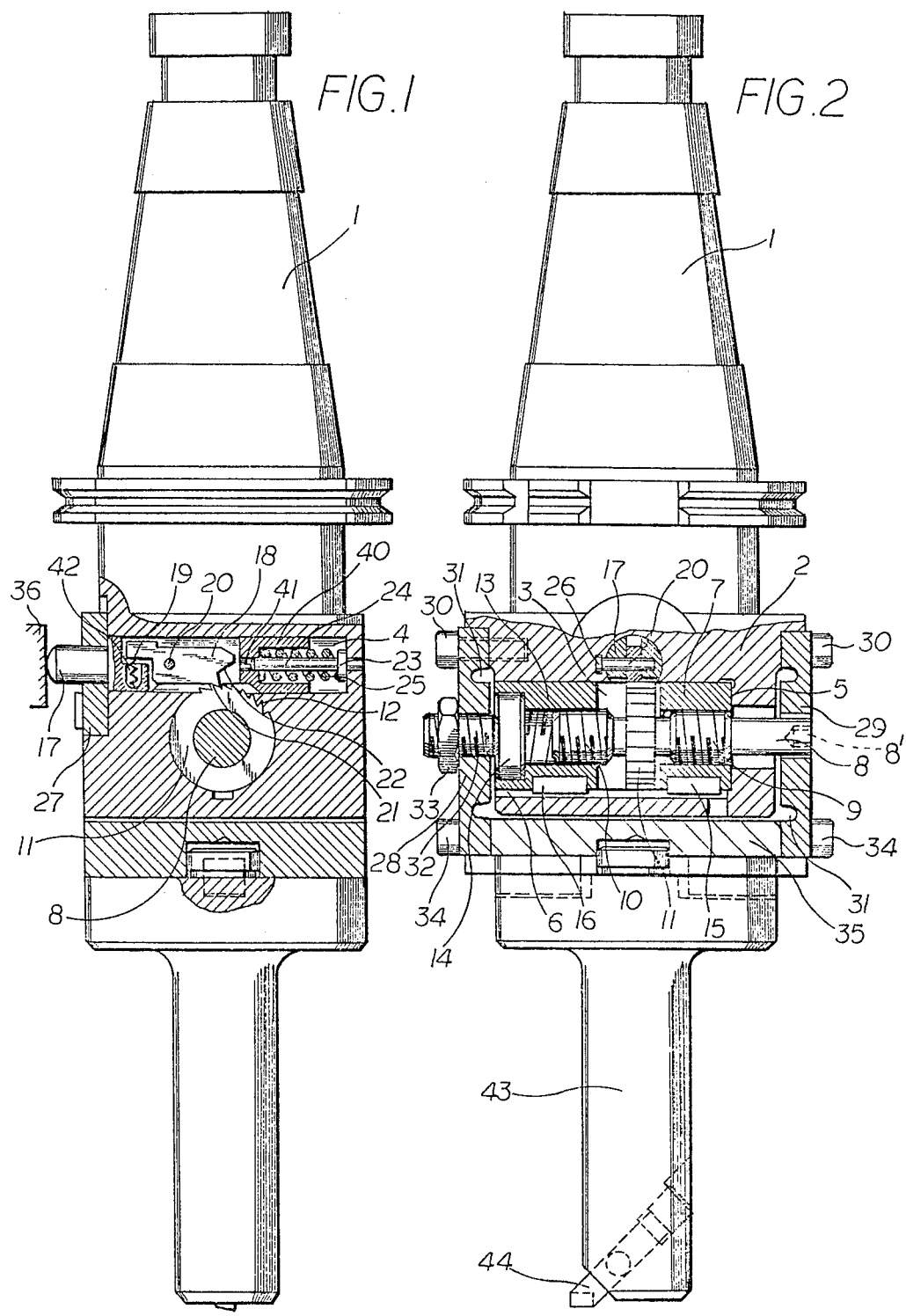

ROTARY TOOL WITH TOOL POSITIONING ADJUSTMENT

FIELD OF THE INVENTION

My present invention relates to a rotary tool provided with a device for adjusting the position of the cutting edge of the tool and, more particularly, to a boring tool adapted to be received in the spindle of a machine tool and comprising a carrier, e.g. a taper, relative to which the cutting edge of the tool, e.g. the tool bit, is adjustable.

The invention is especially applicable to automatic and semi-automatic machine tools an particularly numeral control (NC) machine tools which can have automatic means for changing the tool bits and positioning both the tool and the workpiece in accordance with predetermined or derived sets of instructions.

BACKGROUND OF THE INVENTION

In modern machine tool operations, especially for precision machining, boring, removal of material utilizing a cutting tool, it is common practice after a machining operation to measure the workpiece and adjust the position of the tool in accordance with the measurement, i.e. so as to compensate for any dislocation of the tool from its planned position based upon the programming of the machine.

While this generally does not pose a problem where the workpiece is rotated and the tool is stationary, e.g. in external turning on a lathe or the like, since the energy necessary to adjust the position of the tool can be applied to the latter without concern for the rotation of the spindle, and hence electrical, pneumatic and hydraulic means have been provided for adjusting the tool in the past, when the tool is rotated, e.g. in a boring machine, adjustment of the tool position relative to a tool carrier which is received in the machine spindle poses a problem.

In a boring machine, the workpiece may be held stationary and the tool, in this case a boring bar, is chucked or otherwise received in the tool spindle and may comprise a tool bit which has a cutting edge projecting laterally from the boring bar.

In such cases the use of energy carriers for electrical, pneumatic or hydraulic control of the position of the cutting edge relative to the tool carrier is problematical because of the rotation of the tool.

In machine tools of the CNC (Computer Numerical Control or direct numerical control) type wherein the tool can be automatically changed, for example by drawing new tools from a tool magazine by a so-called tool changer, and inserted into the spindle in the course of machine operation, the ability to adjust the position of the tool bit has proved to be especially important. Upon the termination of a cutting operation, the tool is withdrawn by the tool changer from the spindle and returned to the magazine.

In Speed Automatic Sizing (SAS) systems for numerical control machine tools, the spindle with a tool in place is brought into a defined starting position and, utilizing a steeping motor, the position of the tool bit relative to the tool carrier, i.e. the portion of the tool received in the spindle, can be adjusted.

Such adjustment does not usually involve an absolute shift in the tool bit relative to the carrier but may be a result of a measurement after each cut or after several cuts and is generally an adjustment by a relative amount depending upon the results of the measurement.

Systems of this type utilizing a stepping motor are expensive, massive in size and occupy valuable space in the working region. In addition, they are generally electrically controlled so that complex control systems are required and complications are introduced by the need to deliver electrical energy to the stepping motor.

OBJECTS OF THE INVENTION

It is the principal object of the present invention to provide an improved system for adjusting the position of the cutting edge relative to the carrier of a rotating tool.

A more specific object of the invention is to provide a tool which is especially useful in SAS systems for numerically controlled machine tools in which the setting of the position of the tool bit can be effected without the disadvantages enumerated above of earlier systems.

Another object of this invention is to provide a tool for the purposes described which allows adjustment of the cutting edge relative to the tool carrier manually or utilizing facilities normally present in NC machine tools.

SUMMARY OF THE INVENTION

These objects and others which will become apparent hereinafter are attained, in accordance with the invention, in a tool which comprises a tool carrier received in the rotating spindle of the machine tool, an abutment proximal to which the tool can be brought, and a mechanism on this carrier including a laterally projecting element displaceable by engagement with the abutment for advancing this mechanism and shifting the cutting edge of the tool relative to the carrier.

According to the invention, therefore, no electrical, hydraulic or pneumatic energy source is required since the mechanism is mechanically actuatable. Electrical and electronic elements, others than those which may normally be provided in the NC machine, are not necessary. The unit can universally accept a variety of boring bars or tool bit holders which can be connected to the laterally shiftable member of the carrier interchangeably. The total can be adjusted in absolute increments and well defined increments and the device does not materially limit the available space in the machining region.

The improved adjustable tool of the invention can be utilized in a SAS system more efficiently than earlier tools as follows:

After a machining operation, the tool is removed from the spindle of the machine by a tool changer and returned to the magazine.

The tool changer than inserts a measuring device in the spindle. This measuring device, which can be a conventional indicator or other sensor, can be shifted relative to the workpiece to measure the region previously machined thereof, e.g. the diameter of the bore.

If this diameter is found, as a result of tool wear to deviate from the predicted diameter forecast by the numerical control or preprogrammed instructions, the difference is electrically determined, digitalized and stored in the electronics of the machine as a value assigned to this particular tool.

Before this particular tool is again utilized, after it is inserted into the spindle, the machine movement brings the aforementioned mechanism into contact with the abutment, the requisite number of times to adjust a position of the cutting edge by the amount stored in association with this tool to correct the position of the cutting edge thereof.

The relative movement of the element of the mechanism engaging this abutment is thus effected by the normal tool displacement mechanism of the machine without additional drives, clutches or control elements.

All that may be required is an amplification of the software of the CNC or PC (programmable control) of the machine to allow the offset assigned to each tool to be stored, updated and utilized to adjust the position of the cutting element.

According to a feature of the invention, the movable element of the carrier is a laterally projecting plunger which can lie perpendicular to the axis of the tool and is slidable in a bore which lies orthogonal to the axis of rotation. This has been found to provide especially exact positioning of the cutting edge without calculation of the correction.

A comparably simple mechanism between this element and the movable portion of the carrier can be provided by a free-running mechanism or a stepping mechanism. The stepping mechanism can provide a pawl which is displaced by the plunger and which steps a ratchet wheel rotatable about an axis perpendicular to the direction of displacement of the plunger and connected to the differential screw whose nut bears via a parallelogrammatic linkage upon the movable element of the carrier. The plunger and the pawl may be spring loaded to return them to their original positions after actuation and means can be provided for releasing the pawl from the ratchet to allow rotation of the differential thread in the opposite direction to reset the mechanism to its starting position.

The ratchet wheel preferably is advanced by one tooth, corresponding to an increment of displacement of the cutting edge of the tool (e.g. 2 microns) with each actuation of the plunger and the pawl, and the pawl can be provided with an inclined camming surface which is lifted from the tooth at the end of this incremental displacement of the ratchet wheel.

The increment will also depend on the pitch or pitches of the screwthread or the threads of the adjusting screw. Preferably, the adjusting screw is axially shiftable in the housing formed by the tool carrier and has two screwthreads on opposite sides of the ratchet wheel of different pitch but the same rotational sense. One of these threads engages in a fixed spindle nut while the other thread engages in an axially shiftable spindle nut which bears upon the movable portion of the carrier. The displacement of the latter nut with a given rotation of the spindle will amount to the product of the fraction of spindle rotation and the difference of the pitches of the two screws.

I have found it to be possible to support and guide the movable member of the carrier on the housing by a parallelogrammatic linkage formed by a pair of plates flanking this housing and secured respectively to the housing and to the movable member while being provided with reduced-thickness zones at which bending is permitted to allow deformation of the plates. The reduced-thickness zones can be formed by groups which define hinges in the plates about which portions of the plates can pivot for the parallelogrammatic action.

The plates together with the movable portion of the carrier thus form a cage enclosing a mechanism within the housing and protecting the mechanism therein.

To facilitate the initial setting of the cutting edge of the tool, the carrier can be provided with an adjusting screw preferably in one of the plates and most advantageously the plate in which the movable nut displaces the linkage. This adjusting screw, which can have a locking nut, allows initial positioning of the cutting edge without required machine operation or activation of the control program of the machine.

Since the positioning of the cutting edge is effected exclusively mechanically by the system of the invention and the movement of the threaded spindle or adjusting screw and its nuts is limited, the setting of the cutting edge is confined to the permissible movements and the degree of setting will depend only upon the number of contacts (engagements) induced between the plunger and the abutment. The number of permissible increments can be stored in the machine program and when added adjustments reach the permissible level, the tool has achieved maximum adjustment and a signal is given which allow replacement of the tool bit and/or resetting of the mechanism by hand.

This can be achieved by disengaging the pawl and inserting a key or other tool in one end of the threaded spindle to rotate the same in the opposite sense. For this purpose the end of the threaded spindle must be accessible to the tool.

BRIEF DESCRIPTION OF THE DRAWING

The above and other objects, features and advantages of the present invention will become more readily apparent from the following description, reference being made to the accompanying drawing in which:

FIG. 1 is an elevational view of a boring tool according to the invention, partly broken away, in an axial cross section;

FIG. 2 is a similar view of the boring tool but with the section taken at right angles to that of FIG. 1.

SPECIFIC DESCRIPTION

Figure 3:
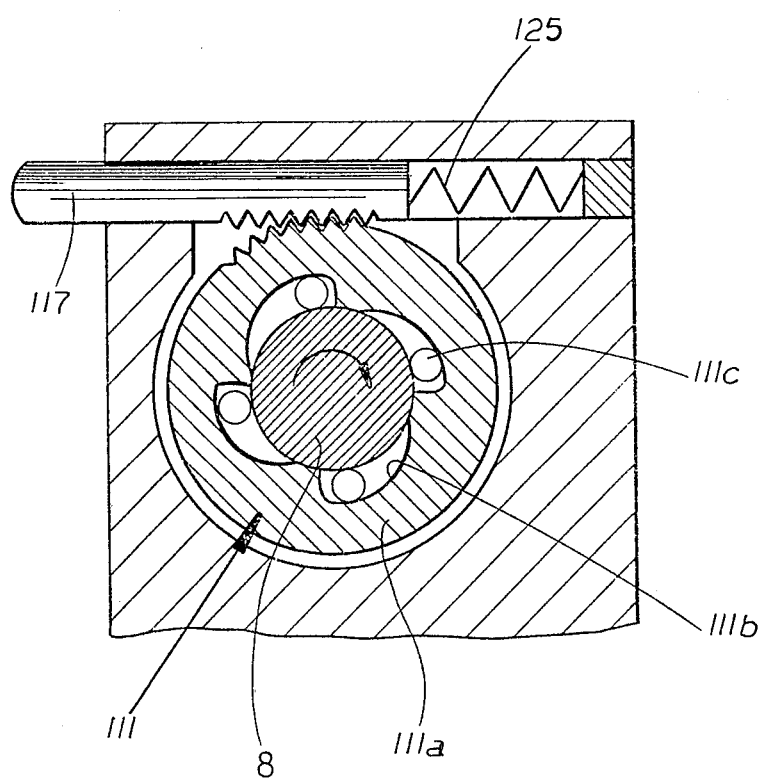
FIG. 3 is a fragmentary section illustrating another mechanism for stepping the threaded spindle in accordance with the invention.

The boring tool shown in FIGS. 1 and 2 is intended to be received in the rotating spindle of a CNC machine tool for the boring, utilizing a tool bit 44, of a stationary workpiece (not shown). The rotating spindle is provided with a Morse taper chuck adapted to receive the Morse or other taper 1 of the tool carrier. The taper can be any standard machine tool taper, e.g. corresponding to German Industrial Standard DIN No. 69 871.

The taper 1 carries a substantially cubic housing 2 formed with two bores 3, 4 in axially offset relationship and at right angles to one another. The bore 3 is formed with a step 5 in which a spindle nut 7 is seated.

Along the bore 3 there is formed a longitudinal groove receiving a key 15 of the nut 7 whereby this nut is prevented from rotating within the bore 3.

A threaded spindle 8 has the threaded portion 9 received in the nut 7 and another threaded portion 10 received in nut 13 which is shiftable along the bore but prevented from rotating thereof by a key 16.

Between the threaded portions 9 and 10, the spindle is provided with a ratchet wheel 11 formed with a sawtooth crown 12.

The ratchet wheel 11 is of such a diameter that is projects into the bore 4 which is partly intersected by the bore 3.

Within the bore 4, a longitudinal shiftable plunger 17 is provided, this plunger projecting laterally from the bore 4 through a cover 27 which closes this bore and its left hand end (FIG. 1).

The plunger 17 is provided with a slot within which a pawl 18 is received, the pawl 18 being biased in a clockwise sense by a compression spring 19 (FIG. 1) about the axis defined by a pin 20 traversing this slot and guided at one end in a longitudinal groove 26 of the bore 4 so that the plunger 17 is axially shiftable but cannot rotate in the bore 4.

The free end of pawl 5 is provided with a tool 21 engageable with the toothed crown 12 of the wheel 11, and with a camming flank 22 which can ride up on the point 24 of a guide pin 23 when this pawl is shifted to the right and after it has rotated the ratchet wheel 11 by an increment corresponding to one tooth.

The pin 23 forms a guide for an axially slidable sleeve 40, biased to the left (FIG. 1) by a spring 25 surrounding this pin and constituting a restoring spring. The sleeve 40, upon engagement by the pawl 18, tends to return it to the left after an increment-stepping stop of the plunger.

The plunger 17 also has a step 42 which cooperates with the plate 27 to limit the displacement of the plunger to the left. As can be seen from FIG. 2, the housing 2 is flanked by a pair of plates 28 and 29 which are attached by screws 30.

Screws 34 attach the plates at their lowest edges to a movable member 35 of the carrier, i.e. a support plate to which the conventional boring rod 43 can be removably attached.

The plates 28, 29 have in the region of their upper and lower edges and inwardly of the screws 30 and 34, grooves 31 which reduce the cross section of these plates and form bending zones or articulations so that the plates constitute a parallelogrammatic linkage connecting the support plate 35 to the housing 2.

The plate 28 also is provided with an adjusting screw 32 which can be locked in place by a counternut 33 and which bears upon a pressure disc 14 against which the nut 13 acts.

The tool of FIGS. 1 and 3 is utilized as follows:

After a bore has been completed, a measuring device is exchanged for the tool in the spindle of the machine and the actual dimensions of the bore are detected.

If the actual value measurement is in the upper tolerance range, a corresponding signal is delivered to the control program and further machining steps are controlled in the usual manner.

If, because of wear of the cutting edge, the measurement shows a value below the lower tolerance limit, the deviation from the set point dimension is detected and the diameter or radius difference calculated and digitalized in, for example, two micron increments.

The number of these two micron increments is stored together with the tool identification.

When this tool is again used, the stored value of the number of correction increments is drawn from the memory. If no rotation is required, the tool is simply inserted in the spindle and used for the appropriate machining operation.

If a correction is required, immediately after the tool is inserted in the spindle, a subprogram is initiated utilizing tool movement mechanism of the machine to bring the plunger 17 into contact with a fixed abutment 36 on the machine, a number of times which corresponds to the number of increments by which the tool must be adjusted.

With each such contact, the plunger 17 is shifted to the right (FIG. 1) to compress the spring 25 and step the ratchet 11 by one tooth increment, the pawl being then lifted by the pin 23 from the ratchet. The spring 25 returns the plunger to its initial position after each increment against the plate 27.

With each angular stepping of the ratchet 11, the threaded spindle is angularly displaced and depending upon the pitch of the thread 9 is shifted to the left (FIG. 2). Simultaneously, the nut 13 is shifted to the left by the thread 10.

Since the pitch of thread 10 is greater than the pitch of thread 9, the nut 13 will move to the left by an amount which is proportional to the difference of the two pitches.

The movement of the nut 13 to the left is applied via the pressure disk 14 to the screw 32 and hence the parallelogrammatic links 28, 29 displace, at each increment, the plate 35 to the left by an increment of two microns.

When the stored value of the total number of increments of adjustment permitted is equal to the number of increments by which the tool has been adjusted, a signal is generated which allows replacement of the tool bit 44 and resetting of the mechanism.

To this end the plunger 17 is pressed fully inwardly so that the pin 23 lifts the pawl 18 out of the ratchet 11. A key is then inserted into the hex recess 8' in the end of the threaded spindle 8 to allow rotation of the threaded spindle to its original position.

In FIG. 3, I have shown, somewhat diagrammatically, an alternative system for stepping the threaded spindle 8 previously described. In this system, the threaded spindle 8 is advanced by a free wheeling clutch 11 which can be formed by a ring 111a having arcuate seats 11b for balls 111c. Each time a plunger 117, therefore, is displaced to the right against the force of a restoring spring 125, the balls 111c are wedged against the spindle 8 to rotate it in the clockwise sense.

During the return movement to the left, the ring 111a freewheels in the opposite sense.

I claim:
1. A rotating tool comprising:
   a tool carrier adapted to be received in a rotating spindle of a machine tool;
   a support on said carrier shiftable laterally of the axis thereof;
   a cutting member mounted on said support;
   an actuating element on said carrier displaceable relative to said carrier by engagement of said element with an abutment; and
   a mechanism on said carrier connecting said element with said support for translating displacement of said element into adjustment of the position of said support relative to said carrier, said element being a plunger projecting laterally from said carrier and displaceable orthogonal to the axis of rotation thereof, said mechanism including a stepping device connecting said element to said support and comprising:
   a pawl operatively connected with said plunger,
   a ratchet wheel cooperating with said pawl for the stepping of said ratchet wheel upon actuation of said plunger,
   a threaded spindle coupled with said ratchet wheel, and a nut threadedly engaging said threaded spindle, said nut and threaded spindle acting upon said support.

2. The tool defined in claim 1, further comprising restoring spring means acting upon said plunger for resisting the displacement thereof.

3. The tool defined in claim 1 wherein said pawl has a camming surface, further comprising means engaging said camming surface upon displacement of said ratchet wheel through an increment corresponding to one tooth thereof for lifting said pawl from said ratchet wheel.

4. The tool defined in claim 1 wherein said threaded spindle has two threaded portions of the same sense but of different pitches, one of said threaded portions being engageable by a nut movable in said carrier and acting upon said support, the other of said threaded portions engaging in a nut axially fixed in said carrier.

5. The tool defined in claim 1, further comprising a parallelogrammatic linkage between said support and said carrier.

6. The tool defined in claim 5 wherein said parallelogrammatic linkage comprises a pair of plates having bendable portions and connected to said carrier and said support.

7. The tool defined in claim 6 wherein said bendable portions are formed by grooves in said plates.

8. The tool defined in claim 5, further comprising an adjusting screw between said movable nut and said support.

9. The tool defined in claim 5 wherein said spindle is provided with means at one end thereof engageable from the exterior of said support for rotating said spindle and restoring said mechanism to an original position.

* * * * *